J. C. KEPNER.
AUTOMATIC CHECK VALVE FOR TRAIN PIPE COUPLINGS.
APPLICATION FILED AUG. 29, 1910.
986,992.
Patented Mar. 14, 1911.
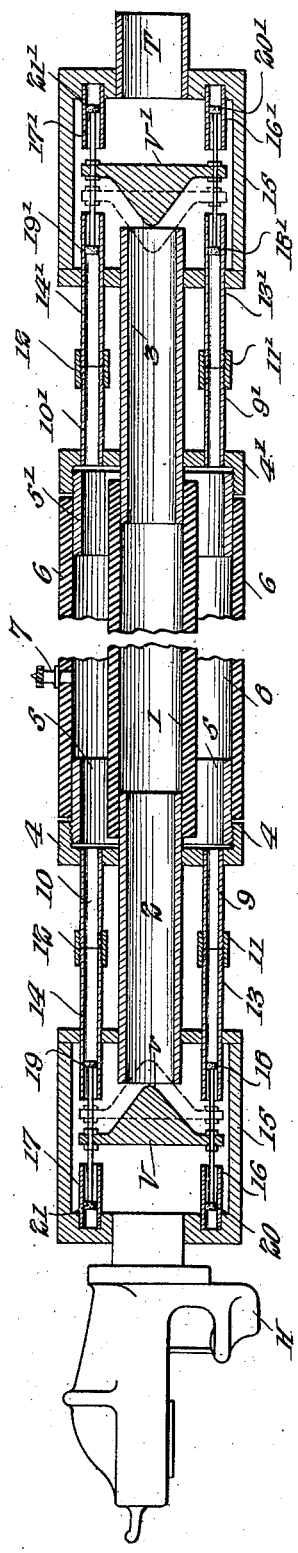
WITNESSES:
E. M. Callaghan
L. A. Stanley
INVENTOR
JAMES C. KEPNER
BY Munn & Co.
ATTORNEYS

UNITED STATES PATENT OFFICE.

JAMES CALVIN KEPNER, OF NEW CUMBERLAND, PENNSYLVANIA.

AUTOMATIC CHECK-VALVE FOR TRAIN-PIPE COUPLINGS.

986,992.

Specification of Letters Patent. Patented Mar. 14, 1911.

Application filed August 29, 1910. Serial No. 579,367.

*To all whom it may concern:*

Be it known that I, JAMES C. KEPNER, a citizen of the United States, and a resident of New Cumberland, in the county of Cumberland and State of Pennsylvania, have made certain new and useful Improvements in Automatic Check-Valves for Train-Pipe Couplings, of which the following is a specification.

My invention relates to improvements in train pipe couplings, and it consists in the combinations, constructions and arrangements hereinafter described and claimed.

An object of my invention is to provide a check valve which, when the train is coupled, will be held away from its seat so as to permit the passage of air into the train pipe, but which, if the main coupling should break and the train pipe coupling should fall apart, would reseat so as to prevent the sudden discharge of air from the train pipes and the sudden setting of the brakes.

A further object of my invention is to provide a novel form of coupling by means of which the object first mentioned may be accomplished. This coupling comprises two flexible portions as will be hereinafter described.

A further object of my invention is to provide novel means for holding the valve in its inoperative position.

Other objects and advantages will appear in the following specification and the novel features of the device will be particularly pointed out in the appended claims.

My invention is illustrated in the accompanying drawing which is a central section through one-half of the train pipe coupling, the other half being precisely the same.

In carrying out my invention, I provide an inner flexible connection 1 at whose ends are inserted the respective tubes 2 and 3. Secured to the tube 2 is a head 4, which is threaded to receive a ring 5. Secured to the end of the tube 3 is a similar head 4' attached to a ring 5'. Between the rings 5 and 5' and secured thereto is an outer flexible connection 6, which is provided with a valve 7 of any suitable form similar to the valve of a pneumatic tire. Between the outer tube 6 and the inner tube 1 is a space 8.

Secured in the head 4 are the two pipes 9 and 10, which are connected by the unions 11 and 12 to registering pipes 13 and 14, respectively. These latter pipes pass through the walls of a valve casing 15. Short pipes 16 and 17 registering with the pipes 13 and 14 are carried on the opposite side of the valve chamber.

Disposed in the respective pipes 13 and 14 are the pistons 18 and 19, while on the same piston rods are the pistons 20 and 21, which enter the pipes 16 and 17. A valve member V is secured to the piston rods and its end $v$ is adapted to project into the opening of the tube 2, as shown in dotted lines, to close the latter.

An ordinary coupler head is shown at H, this being secured in the wall of the casing 15. The tube 3 projects into a casing 15' having the tubes 13' and 14', 16' and 17', the pistons 18', 19', 20' and 21' and the valve V'. The tubes 9' and 10' are connected with the respective tubes 13' and 14' by the nipples 11' and 12'.

From the foregoing description of the various parts of the device the operation thereof may be readily understood. When the cars are coupled the space 8 between the outer flexible connection 6 and the inner tube 1 is filled with compressed air through the valve 7. This acts upon the pistons 18—19, 18'—19' and causes each of the valves V and V' to unseat and to take the position shown in full lines in the figure. In doing this the air in the pipes 20, 21 and 20', 21' is compressed to a certain extent. The valves V and V' are thus held in such a position that the air from the train pipe T may flow through the inner tube and to the coupler head H, thus having a continuous passage. If, now, the main car coupling should break at any point between the cars, the train pipe coupling would be pulled apart. The main or outer tube is ruptured, the compressed air escapes and the air in the pipes 16, 17, 16', 17' forces the valves V and V' against their sides. This is facilitated by the pressure of the air in the train pipe itself. It will be understood that these valves act instantly to close the ends of the tubes 2 and 3 and, therefore, prevent the escape of air from the train pipe and the sudden setting of the brakes, which would eventually result. It is the sudden setting of the brakes in trains, which are provided with the ordinary train couplings, that causes a great deal of trouble, the tendency being to throw a train from the track and to subject it to the dangers which ordinarily occur when a train leaves the track. With my device, however, there is no danger of the brakes being suddenly thrown on, because the resetting of the valves, as explained above, will prevent the air in the train pipe from passing out. The engineer will then have control of his train and may slow down as soon as he pleases by manipulating the train pipe valve in the ordinary manner.

I claim:—

1. In a train coupling device, a hose, pipes at each end of said hose and communicating directly therewith, a valve arranged to close each pipe and pneumatic means for normally retaining each of said valves in an inoperative position.

2. In a train coupling device, an inner flexible connection, an outer flexible connection surrounding said inner connection, the space between said flexible connections serving as a chamber for compressed air, pipes at the ends of said inner flexible connections, and a valve for closing each of said pipes, said valves being normally held in inoperative position by the compressed air.

3. In a train coupling device, an inner flexible connection, a pipe inserted in each end of said flexible connection, a head secured near one end of each of said pipes, a bearing ring secured to each of said heads, an outer flexible connection between said bearing rings, a valve casing at the other end of each of said pipes, a movable valve in each valve casing adapted to close the end of its respective pipe, and means for holding said valves in an inoperative position, said means comprising air pipes communicating with the space between said flexible connections and pistons disposed in said air pipes and being connected with said valves.

4. In a train coupling device, an inner flexible connection, a pipe inserted in each end of said flexible connection, a head secured near one end of each of said pipes, a bearing ring secured to each of said heads, an outer flexible connection between said bearing rings, a valve casing at the other end of each of said pipes, a movable valve in each valve casing adapted to close the end of its respective pipe, means for holding said valves in an inoperative position, said means comprising air pipes communicating with the space between said flexible connections and pistons disposed in said air pipes and being connected with said valves, guide cylinders carried by each of said valve casings, and guide pistons arranged to move in said guide cylinders, said pistons being connected with their respective valves.

JAMES CALVIN KEPNER.

Witnesses:
JNO. A. KEPNER,
E. M. NICHOLS.

Copies of this patent may be obtained for five cents each, by addressing the "Commissioner of Patents, Washington, D. C."